US007299109B2

(12) United States Patent
Juds et al.

(10) Patent No.: US 7,299,109 B2
(45) Date of Patent: Nov. 20, 2007

(54) VENDING MACHINE HAVING PROMOTIONAL FEATURES

(75) Inventors: Scott Juds, Seattle, WA (US); James H. Halsey, El Dorado, AR (US)

(73) Assignee: IDX, Inc., El Dorado, AR (US)

( * ) Notice: Subject to any disclaimer, the term of this patent is extended or adjusted under 35 U.S.C. 154(b) by 284 days.

(21) Appl. No.: 11/190,940

(22) Filed: Jul. 28, 2005

(65) Prior Publication Data

US 2007/0027576 A1 Feb. 1, 2007

(51) Int. Cl.
*G06F 17/00* (2006.01)

(52) U.S. Cl. ........................ 700/238; 700/232; 700/237

(58) Field of Classification Search ................ 700/232, 700/238; 235/375, 376, 378, 380, 381
See application file for complete search history.

(56) References Cited

U.S. PATENT DOCUMENTS 3,499,739 A 3/1970 Segal
4,213,524 A 7/1980 Mayashita
5,046,841 A 9/1991 Juds et al.
5,371,681 A 12/1994 Juds et al.
5,535,921 A 7/1996 Gelman
5,988,346 A 11/1999 Tedesco
6,021,362 A 2/2000 Maggard
6,021,882 A 2/2000 Juds et al.
6,112,876 A 9/2000 Juds et al.
6,575,363 B1 6/2003 Leason
6,658,323 B2 * 12/2003 Tedesco et al. ............. 700/232
7,233,912 B2 * 6/2007 Walker et al. ............. 700/238
2002/0107610 A1 8/2002 Kaehler
2003/0186732 A1 10/2003 Viglione
2006/0102645 A1 * 5/2006 Walker et al. ................ 221/75

* cited by examiner

*Primary Examiner*—Gene O. Crawford
*Assistant Examiner*—Timothy Waggoner
(74) *Attorney, Agent, or Firm*—Diller, Ramik & Wight

(57) ABSTRACT

A vending machine having promotional features, wherein a secured token is associated with a subset of all the items that can be vended, and validation of the token limits the items offered to the patron for his selection to only that subset of items. A first vending machine promotes a new product by the manufacturer of the new product distributing secure promotional tokens good for a free vend or a discount on the price of the new product. In a second vending machine, products from multiple manufacturers are separately promoted using distinct secure promotional tokens for each brand. In a third vending machine providing a plurality of time-metered services, a secure promotional token provides only a limited economy subset of services for the patron's selection from among the plurality of services.

33 Claims, 13 Drawing Sheets

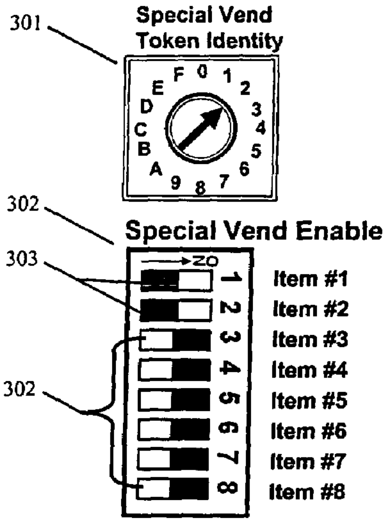

Fig. 8a

350

| Item Description | Sponsor Company | Vend Location | Vend Price | Token Association | Token Association |
|---|---|---|---|---|---|
| Chocolate Chip 6oz | MyCookies Inc. | 1A | $1.25 | #13 | - |
| Oatmeal Berry 6oz | MyCookies Inc. | 1B | $1.25 | #13 | - |
| Peanut Butter 6oz | MyCookies Inc. | 1C | $1.00 | #13 | - |
| Hot Freeko Chips 3oz | Red Chip Co. | 2A | $.75 | - | - |
| Thick Potato Chips 3oz | Red Chip Co. | 2B | $.65 | - | - |
| Purple Corn Chips 2oz | Red Chip Co. | 2C | $.65 | - | - |
| Apple-Mango 12oz | Fizz Juice Inc. | 3A | $1.50 | #14 | - |
| Cherry-Berry 12oz | Fizz Juice Inc. | 3B | $1.50 | #14 | #15 |
| Peach-Orange 12oz | Fizz Juice Inc. | 3C | $1.50 | #14 | - |

Fig. 8b

VENDING MACHINE HAVING PROMOTIONAL FEATURES

FIELD OF THE INVENTION

This invention pertains to vending machines, and in particular to vending machines adapted to accepted a promotional token associated with only a fractional subset of its available products or services and limiting the machine's offering only to this subset of products or services.

BACKGROUND OF THE INVENTION

Product manufacturers and retailers have always been interested in finding new ways to better attract a prospective customer into trying one of its products. People easily get stuck in pattern behavior and often require some incentive to try an alternative brand or to try a new product being introduced to the marketplace.

Product promotions via product specific discount coupons are commonly found in newspapers, magazines, periodicals, and much of what is generally referred to as junk mail. The coupon is clipped out of the periodical and taken to the retail store were the promise of a bargain value results in a purchase at a discounted price, thus achieving the sponsor's objective of inducing people to try their product.

Various prior art vending machine systems provide volume discounts, extra prize vends, discount coupons and other incentives to attract patrons to the machine. A subscription system in which customers pre-pay for a particular vending machine product in order to receive a per-unit discount on purchased items is disclosed in U.S. Pat. No. 5,988,346 granted Nov. 23, 1999 to Tedesco, et al. An automatic vending machine with lottery bonus is disclosed in U.S. Pat. No. 4,213,524 granted Jul. 22, 1980 to Miyashita, et al. and has a plurality of electric lamps arranged geometrically on a front panel of the machine and a lamp control circuit for lighting the lamps successively in response to a vending signal and produces a winning signal for discharging an extra article if the light spot is stopped at a predetermined lamp having a lucky number. A vending machine randomly dispensing special prize items in addition to selected items is disclosed in U.S. Pat. App. No. 2002/0107610 filed Aug. 8, 2002 by Kaehler, et al. wherein the special prize item may be substituted for the desired product or vended at random in addition to the desired product. Finally, a vending machine that randomly produces a proof-of-purchase coupon to provide the customer a discounted price on a later purchase from a similarly equipped machine is disclosed in U.S. Pat. No. 6,575,363 granted Jun. 10, 2003 to Leason, et al.

In the category of vending free trial samples to prospective customers, while there have been specific machine designs for dispensing fluids and sprays in a retail environment, as for example the mannequin shaped perfume sample dispenser disclosed in U.S. Pat. No. 5,535,921 granted Jul. 16, 1996 to Gelman, the prior art is void of any vending machine system for dispensing general product samples that enable a product manufacturer to attract existing customers of one of its brands to try a free sample of another of its brands.

What is needed and has heretofore not been available is a vending machine that can be used to promote one or more products within a larger group of products offered by the vending machine. Subscription systems use discounts to promote general use of the vending machine rather than to enable promotion of a particular product. Similarly, vending machines with a lottery feature use the random dispensing of prizes to promote general use of the vending machine rather than to enable promotion of a particular product. Still other vending machines having coupon printing and reading capabilities are logistically suited toward promoting the route operator's agenda versus promoting a product manufacturer's agenda because each of a) the coupon printing strategy, b) the coupon printing probability, c) the coupon value, and d) the coupon acceptance locations are under the control of the route operator rather than the product manufacturer. Furthermore, coupon printers represent an additional cost burden for a vending machine and are generally considered unreliable in outdoor environments. In addition to the need for a vending machine that can be used to promote one or more specific products within the larger group of products available from the machine, there has been little consideration given to the logistics of exception handling for circumstances when a patron's behavior does not conform to the intended sequence of operation, including a) what should happen when multiple promotional tokens are received, b) what should happen for a subsequent patron when a vend cycle for a prior patron was begun with a promotional token is not completed, c) what should happen when a patron requests change from the machine to cancel a purchase that included value provided by a promotional token, and d) how a patron knows which subset of items are available for vending with the promotional token.

As can readily be appreciated from the foregoing, there remains a need for further improvement in the features, structure, function and operation of vending machines particularly as they pertain to the promotion of only a subset of the products or services that can be vended by the machine.

SUMMARY OF THE INVENTION

In a first embodiment of the present invention a vending machine is adapted to promote a new product being offered by a manufacturer. The manufacturer of the new product distributes secure promotional tokens good for a free vend or a discount on the price of the new product. Vending machines are adapted to recognize and accept the promotional token and apply its credit value only to the promoted product within the array of products available from the machine. Logistical token management features are implemented to allow for acceptance of two different promotional tokens towards the vend of a promoted product, to ensure that a patron clearly can see which subset of items are available for selection, and to ensure that a patron's failure to complete a vend cycle incorporating a promotional token does not prevent subsequent patrons from purchasing other items from the machine.

In a second embodiment of the present invention a vending machine offering branded products from multiple manufacturers is adapted to separately promote products from different manufactures or that are differently branded. Each manufacturer desiring to promote one or more of its products or brands in the machine distributes a distinct secure promotional token good for a free vend or a discount on the price of the product. Vending machines are adapted to recognize, accept, and distinguish between multiple promotional tokens and apply its credit value only to the promoted product within the array of products available from the machine. Logistical token management features are implemented to allow for acceptance of two different promotional tokens towards the vend of a promoted product, to ensure that a patron clearly can see which subset of items are available for selection, and to ensure that a patron's failure to complete a vend cycle incorporating a promotional token does not prevent subsequent patrons from purchasing other items from the machine.

In a third embodiment of the present invention a sample vending machine is adapted to freely dispense product samples of one of a plurality of brands to a patron. The sponsoring manufacturer of the branded products distributes secure promotional tokens within or attached to full sized products sold at retail stores wherein each distinct secure promotional token is associated the specific product brand providing the token. The sample vending machine is adapted to recognize, accept, and distinguish between multiple promotional tokens and offer to the patron a subset of all available product sample brands which do not include the specific product brand of the purchase by which the promotional token was acquired. This affords a product manufacturer the ability to encourage a patron of one of its products to try one of its other products without having the patron simply default to taking free samples of a product they clearly already like and are willing to pay for.

In a fourth embodiment of the present invention a vending machine for providing a plurality of time-metered services to a patron is adapted to receive a secure promotional token and provide only a limited economy subset of services for the patron's selection from among the plurality of services. The company providing the time-metered services also provides secure promotional tokens to patrons to encourage them to try the services offered. Upon validation of a secure promotional token, the time-metered service controller automatically determines which subset of services will be made available to the patron based on the time/value ratio of the service, or based on a predetermined selection of one or more services from the plurality of services. Logistical token management features are implemented to ensure that only a single promotional token is accepted per vend of time-metered services, and to ensure that a patron clearly can see which subset of items are available for selection.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 8*a* is a plan view of switch components, and illustrates one embodiment for setting the association between a promotional token and items to be vended.

FIG. 8*b* is a vend item data organization, and illustrates one embodiment for setting the association between a promotional token and items to be vended.

DETAILED DESCRIPTION OF THE INVENTION

According to Webster's dictionary, the meaning of the term "brand" as it relates to products and companies is to put an actual distinctive mark upon something in any way, as with a stencil, or to show quality of contents, name of manufacture, etc. It is common in this world of everyday corporate acquisitions to have multiple levels of branding. For example, Nestle acquired Purina which makes Alpo, and Friskies, all of which are well known trade marked brands in their own right. However, not all products have their own branding. For example, within the Nabisco Honey Maid Grahams brand of crackers are varieties that include honey, cinnamon, chocolate, low fat, and 14.4 oz and 28.8 oz sizes, none of which are individually branded. As used herein, the term brand a) is always associated with a single manufacturer, b) may or may not have sub-brands, and c) may or may not have product varieties that are not separately branded. As used herein, the term manufacturer will refer to the parent company.

According to the online dictionary of the National Institute of Science and Technology, a subset of a first set of elements has one or more, and possibly all of the elements found in the first set, whereas a proper subset of a first set of elements has one or more, but never all of the elements found in the first set. For example, if a vending machine offers five different brands of carbonated beverages, a proper subset of the five different brands includes only one, two, three or four brands, but not all five brands. The importance of this distinction is central to the below description of the present invention.

According to Webster's dictionary, the meaning of the term "token" as it relates to money is a piece of metal intended for currency, and issued by a private party, usually bearing the name of the issuer, and redeemable in lawful money. A more general meaning of the term, also taken from Webster's dictionary is something intended or supposed to represent or indicate another thing. As used herein, the term token will be a blend of these meanings, and specifically will mean something issued by a private party representing credit value toward an item or service offered by that private party.

Use of a token having security features, by necessity, is an important integral part of the present invention. When a token can be used to take something of value away from an unattended vending machine, it is imperative that the token be different from tokens used by other local establishments. When cross-play between tokens from two different establishments occurs because their token validators are unable to distinguish between them, the establishment having the highest value product or service provided by his token generally eventually finds that he will give away a lot of his product or service to people bringing in the lower valued token from the other establishment.

Figure 1A:
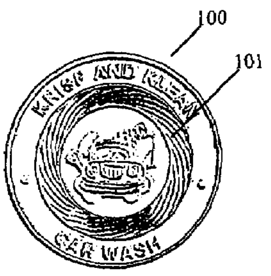
FIG. 1*a* is a top plan view, and illustrates one embodiment of a secured token that is in the shape of a coin having a band of inclined facets that forms a security feature of the token.
Figure 1B:
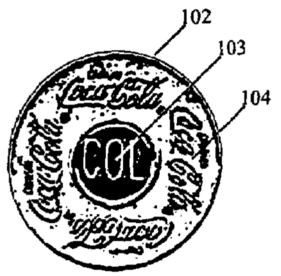
FIG. 1*b* is a top plan view, and illustrates one embodiment of a secured token that is in the shape of a coin having dissimilar central and peripheral alloys that form a security feature of the token.

Security tokens having unique characteristics that can be distinguished by coin validators are described in U.S. Pat. No. 5,046,841 granted Sep. 10, 1991 to Juds, et al. and U.S. Pat. No. 6,021,882 granted Feb. 8, 2000 to Juds, et al. One such example is shown in FIG. 1*a* as a metallic token 100 having reflective facets 101 minted at specific angles to impart a uniquely identifiable code to the token. The coin validator checks deposited coins and tokens for this security feature as well as for other more common features, such as the metal alloy and the token's diameter, to determine if the token should be validated. Producing a security token having a bimetal structure wherein its outer periphery is made from a different alloy than its central disc portion is described in U.S. Pat. No. 3,499,739 granted Mar. 10, 1970 to Segal. By mixing different combinations of alloys, many distinguishable security tokens can be produced. One such example is shown in FIG. 1*b* where token 102 has a central region 103 having a first alloy, and an outer peripheral region 104 having a second alloy that is distinguishable from the first alloy. A token validator capable of distinguishing such bimetal security features is disclosed in U.S. Pat. No. 6,112,876 granted Sep. 5, 2000 to Juds, et al. These patents are incorporated herein by reference.

Figure 1C:
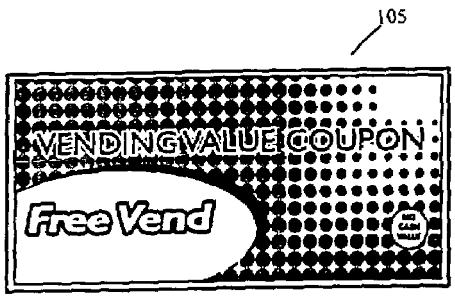
FIG. 1*c* is a top plan view, and illustrates one embodiment of a secured token that is in the shape of paper money having a graphic pattern and paper optical qualities that form a security feature of the token.
Figure 1D:
FIG. 1*d* is a top plan view, and illustrates one embodiment of a secured token that is in the shape of paper money having a graphic pattern and paper optical qualities that form a security feature of the token.

Security tokens, however, needn't be metallic or circular. Just as metal tokens were made to mimic coinage currency, so also have there been so-called token notes made in the shape of paper money. Many bill validator companies print fairly secure token notes for use by their patrons in their businesses, such as token notes 105 and 106 of FIG. 1*c* and FIG. 1*d* from MEI. Today's bill validators look not only at the reflective image properties, but also at the transmitted image properties wherein the light passing through the token note is evaluated. The security is provided by tight control over the image pigments and paper characteristics in both reflected and transmitted colored light.

Figure 1E:
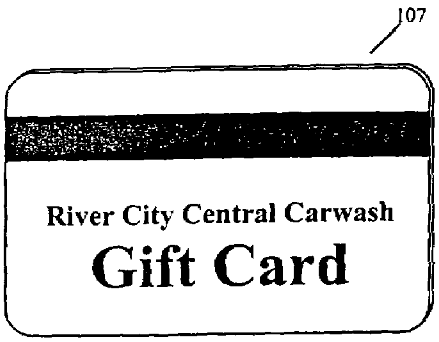
FIG. 1*e* is a top plan view, and illustrates one embodiment of a secured token that is in the shape of a credit card having a magnetic stripe for a magnetic code that forms a security feature of the token.
Figure 1F:
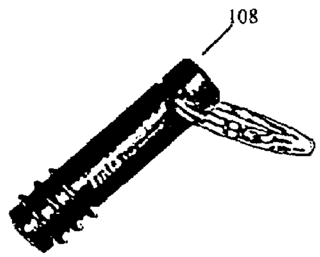
FIG. 1*f* is a top plan view, and illustrates one embodiment of a secured token that is in the shape of a key fob having an RFID chip with and ID code that forms a security feature of the token.

A security token may also be an object holding a customer identification code, such as a card 107 of FIG. 1*e* having a magnetic strip or a key-fob 108 of FIG. 1*f* having an embedded RFID chip. Systems utilizing a customer identification code as a token with the present invention must additionally provide a means for limiting over-use by the patron as a customer ID token it is not inherently a one-time use token akin to a metal token or a token note. This problem may be overcome by maintaining a database of customer identification codes previously read. If multiple machines are involved, networking the databases of the machines will additionally be required.

When a company develops a new product, in addition to simply making the product available for purchase, it generally must also find a means for inducing customers to try the new product in hopes that they will like it and continue to buy it in the future. While the printing of product specific coupons works well at the retail level, this method of promotion does not work well for vending machines. Vending machines today are only capable of taking currency, credit cards, or tokens. A token is good for either a predetermined value, or good for a single vend, whatever that may be worth. The token 100 of FIG. 1*a*, for example, is used in a self-service carwash where time-metered services are vended and is valued at 25¢. The token 102 of FIG. 1*b* had a value of one vend and was used in soft drink vending machines in South America during a period of time when runaway inflation otherwise would require weekly reprogramming of all of the vending machine controllers to keep up with the rapid price changes. Token notes similar to the token notes 105 and 106 of FIG. 1*c* and FIG. 1*d* respectively provide one free vend and a fixed value of $1.00 towards any item in the machine, and are often used in a company lunch room setting for various promotional purposes, or as a kind consideration for company visitors.

Today's problem with having a token represent value for only some of a machine's offered items (a proper subset) is not really a limitation of tokens, but a limitation of the vending machine controllers. That said, simply providing a means for associating a token with only a proper subset of the offered items is still not a complete solution in and of itself. Once a promotional token of this sort is accepted, a few additional token management problems arise that require solutions as well. These include a) what to do when a patron attempts to use multiple tokens prior to vending an item, b) what to do when a patron deposits a promotional token providing partial credit toward a proper subset of items and then walks away without completing the vending cycle, thus leaving the machine in a state unable to deliver an item desired by a subsequent patron that is not a member of the proper subset items associated with the prior patron's promotional token, and c) what to do when after receiving a token and limiting the selection of items to the associated proper subset of items, a patron further deposits monetary credit value sufficient in its own right to allow vending of other items. Solutions for each of these token management problems will be detailed in the paragraphs below with corresponding example application descriptions.

As previously indicated, the central problem of interest is to provide an association of a specific token with a proper subset of the vending machine's available products or services. The scope of the solution required is best understood when reviewing the operational needs of a single category vending machine, a multi-category vending machine, a time-metered service vending machine, and a product sample vending machine. A description of each follows.

Figure 2:
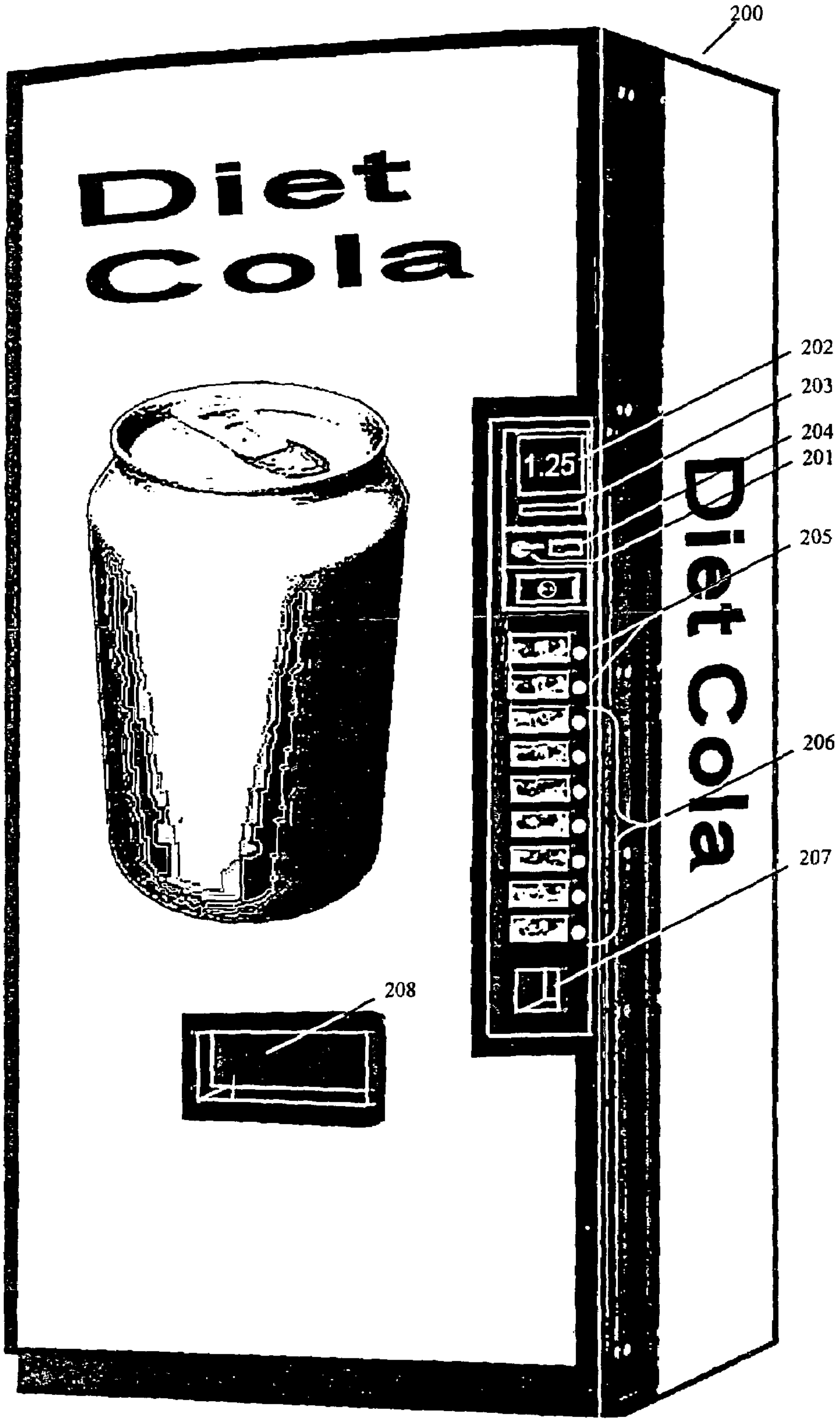
FIG. 2 is a front perspective view, and illustrates a beverage vending machine.

A typical carbonated beverage vending machine 200 is depicted in FIG. 2. A patron normally deposits coins or bill into the vending machine 200 at coin entry slot 204 or bill entry slot 203 for validation by a corresponding coin validator 404 or bill validator 406 within the machine as shown FIG. 6. The amount of currency validated by the vending machine 200 is shown on visual display 202. When sufficient currency has been deposited to enable the vending machine 200 to vend one of the beverages, corresponding selection buttons 205 and 206 of FIG. 2 are enabled to permit the patron to make his selection and activate the vending of the selected product through chute 208. Any excess accumulated credit value is returned to the patron by a coin changer 405 of FIG. 6 through coin return 207 either at the end of a successful vend or as requested through activation of coin return lever 201. Coin return lever 201 generally functions to physically release stuck coins and to activate change request switch 410. The coin return lever 201 may also take the form of a button, and may function to request transaction cancellation.

Most such carbonated beverage vending machines are sponsored by a single manufacturer and uniquely vend only the sponsor's brands. Occasionally sponsors will develop and promote a new brand or product variety. The vending machine 200 is configured to use selection buttons 205 for the new item to be promoted, and selection buttons 206 for the older items. Simply having a discounted promotional price for the new item is problematic for the manufacturer. Between the manufacturer and the end customer are bottlers, distributors, and route operators, any of which can scuttle the promotion through taking the discount themselves without passing it on to the end customer. On the other hand, with a token a manufacturer can a) provide tokens to patrons in another of its packaged products at a grocery store to induce these patrons to learn to use their local vending machines as well as to try the new product, b) control when, how, where, and quantity in the promotion, and c) reimburse route operators according to their actual support of the promotion as measured by the number of tokens collected.

Figure 3:
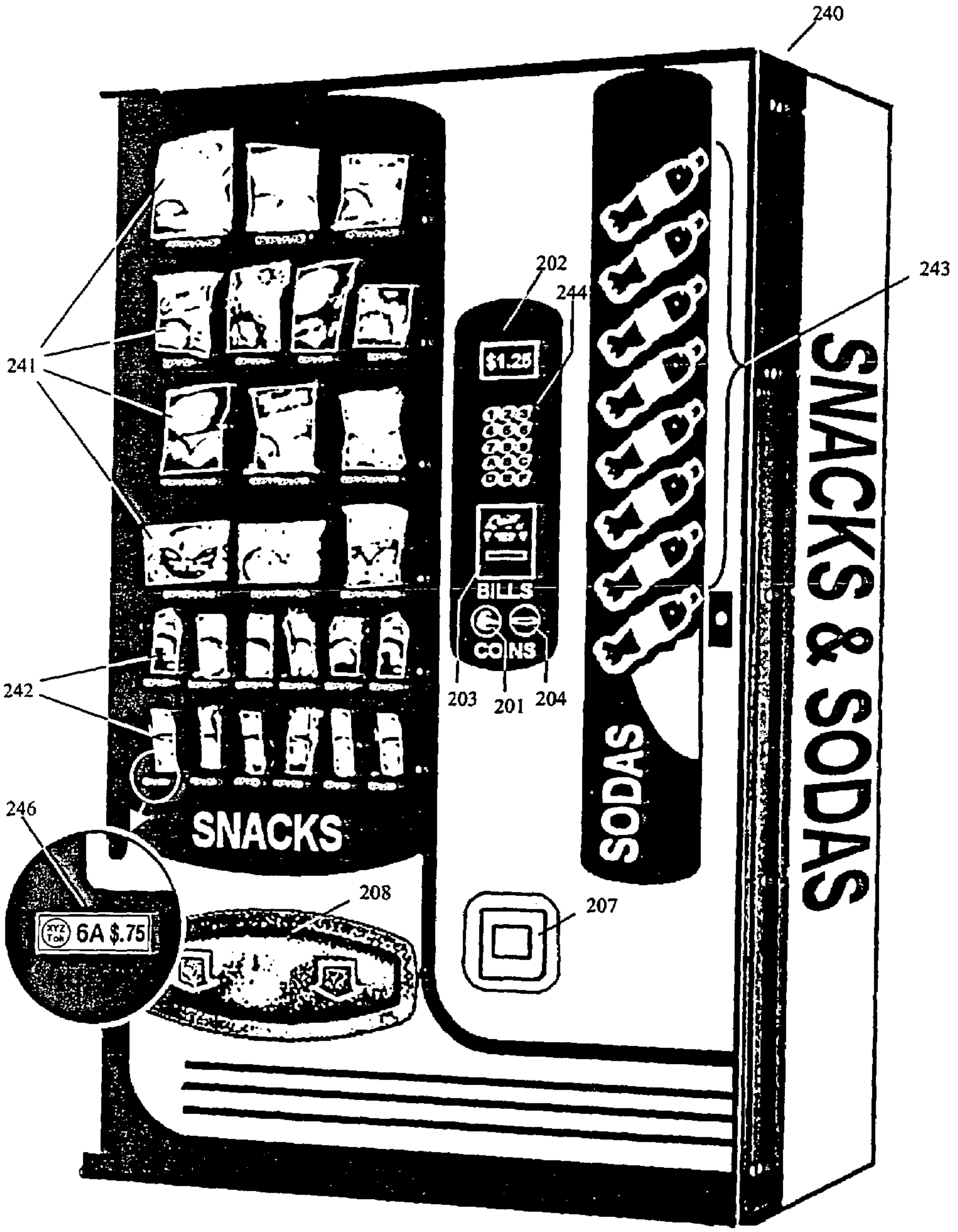
FIG. 3 is a front perspective view, and illustrates a snack and soda vending machine.
Figure 7:
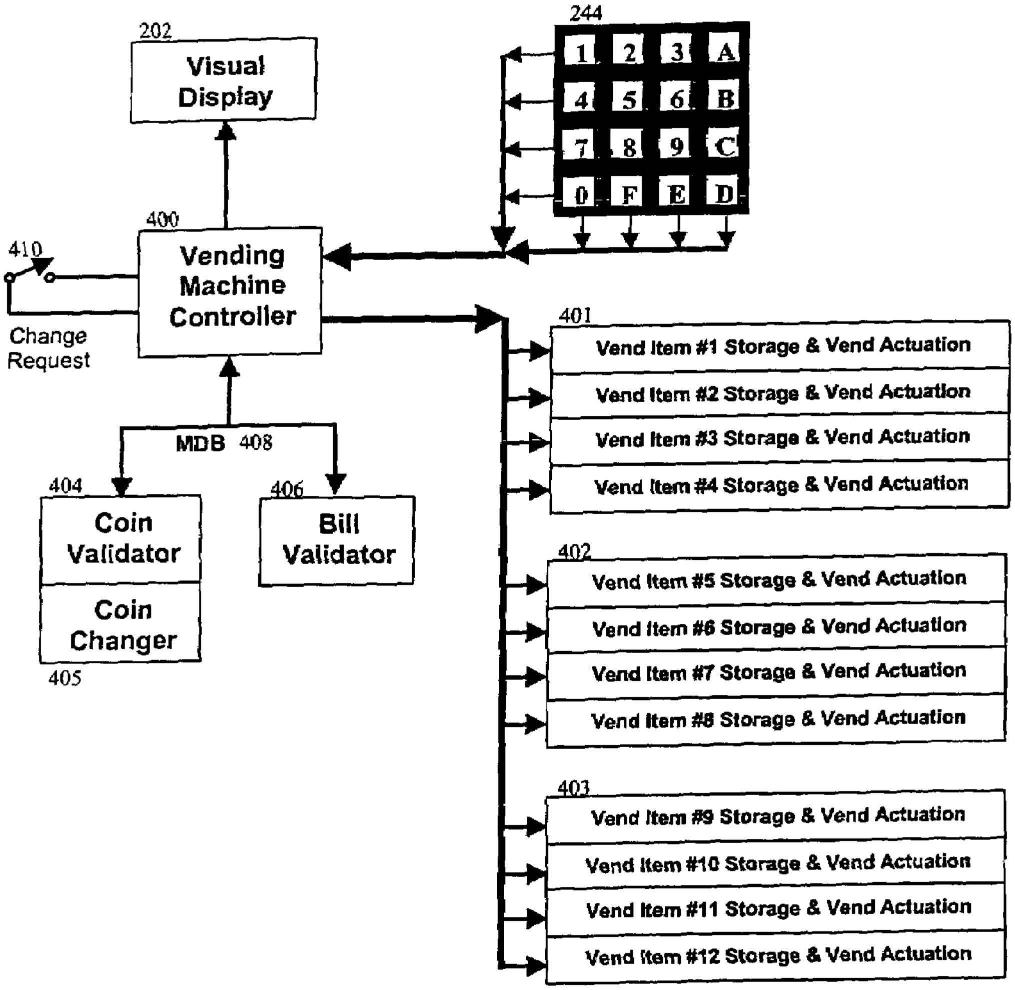
FIG. 7 is a block diagram of a vending machine having promotional features, and illustrates components thereof and cooperative interaction therebetween.

Similar in many ways to the beverage vending machine 200 is a snack and soda vending machine 240 of FIG. 3. A patron normally deposits coins or bill into the vending machine 200 at coin entry slot 204 or bill entry slot 203 for validation by a corresponding coin validator 404 or bill validator 406 within the vending machine 240 as shown in FIG. 7. The amount of currency validated by the vending machine 240 is shown on a visual display 202. When sufficient currency has been deposited to enable the vending machine 240 to vend one of the snacks or sodas, corresponding selection buttons 244 are enabled to permit the patron to make his selection and activate the vending of the selected product through chute 208. Any excess accumulated credit value is returned to the patron by a coin changer 405 of FIG. 7 through coin return 207 either at the end of a successful vend or as requested through activation of coin return lever 201.

Unlike most beverage vending machines 200, most snack vending machines 240 offer products from multiple manufacturer's. In the example vending machine 240 of FIG. 3, bagged chips 241 may be from one manufacturer, candy bars 242 may be from a second manufacturer, and beverages 243 from still a third manufacturer. If the candy bar manufacturer wishes to do a general promotion using a token, it is unlikely that the candy bar manufacturer will be happy if a patron uses a candy bar promotional token for bagged chips, and still be required to reimburse the route operator for the token. Furthermore, having multiple brands from multiple manufacturers suggests the need for a vending machine that can accept multiple distinct promotional tokens, each associated with vending a different proper subset of items available in the vending machine.

Figure 6:
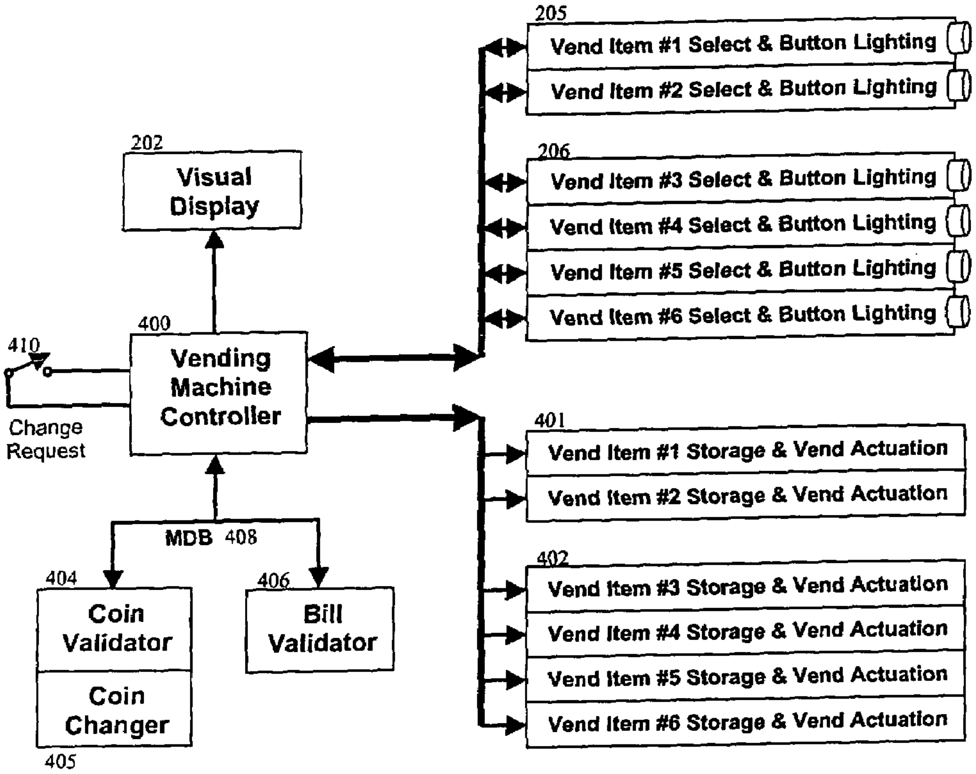
FIG. 6 is a block diagram of a vending machine having promotional features, and illustrates components thereof and cooperative interaction therebetween.

A first preferable means for associating a promotional token with a proper subset of products or brands is illustrated in FIG. 8*a*. The vending machine controller 400 of FIG. 6 or FIG. 7 is designed to incorporate a rotary switch 301 for setting the identity of a special vend token as reported by coin validator 404 or bill validator 406 over MDB link 408. Today, most vending machines use the MDB (Multi-Drop Bus) communication interface to enable the various machine control components to communicate with one another even though they may have been produced by separate and distinct manufacturers. MDB is an open standard maintained and managed by the National Association for Automated Merchandising (NAMA) and is incorporated herein by reference. MDB is an RS-232 derivative having an optically coupled interface and a master/multi-slave topology. Its protocol allows the controller to know when coins or tokens have been received by coin validator 404, to know when bills or token notes have been received by bill validator 406, to know how full the coin changer 405 is, and to command coin changer 405 to return any remaining credit to the patron when the vend cycle has been completed. The MDB protocol includes provision for identification of up to 16 different coin types or bill types, including their respective token types. As can readily be appreciated, rotary switch 301 can then be used to directly reference the identity of a promotional token provided by the MDB message reporting acceptance of a token. DIP switch 302 of FIG. 8*a* is further incorporated in vending machine controller 400 to determine which of the vend items to associate with the promotional token. For purposes of illustration, individual switches 303 are shown enabling Item #1 and Item #2 to correspond with selection buttons 205 of FIG. 2, while individual switches 304 are shown not enabling the remaining items that correspond to selection buttons 206 of FIG. 2. Interfacing rotary switch 301 and DIP switch 302 to a microcontroller parallel port of the vending machine controller 400 so that the switches may be read is fairly simple and is well understood in the art.

A second preferable means for associating a promotional token with a proper subset of products or brands is illustrated in table 350 of FIG. 8*b*. The first column of contains an item description. The second column contains the name of the sponsor company that manufactures the item. The third column contains the reference vend location in the machine in the form of a row/column address. The fourth column contains the item price. The fifth and sixth columns contain an MDB ID number for a token associated with each of the items. In this example, token #13 is associated with only the items manufactured by MyCookies, Inc., token #14 is associated only with the items manufactured by Fizz Juice, Inc., and the Cherry-Berry product of Fizz Juice, Inc. is uniquely associated with token #15. While vending machines such as beverage vending machine 200 typically sell all items for the same price, vending machines such as vending machine 240 must be able to associate a different price with each item, and thus must already contain a location and price database similar to columns three and four of table 350 within the vending machine controller 400, and thus already do provide a means whereby the price of any particular item can be changed as required in the field. It is common to have a configuration menu on such vending machines whereby the keypad selection buttons 244 are used in conjunction with display 202 to navigate the menu and set the price for each item location. A simple extension of the same existing menu systems already in such vending machines can be used to associate the token information of table 350 columns five and six with their respective item vend locations of column 3. Configuration menu systems are well established in vending machines and thus well understood in the art.

Figure 4:
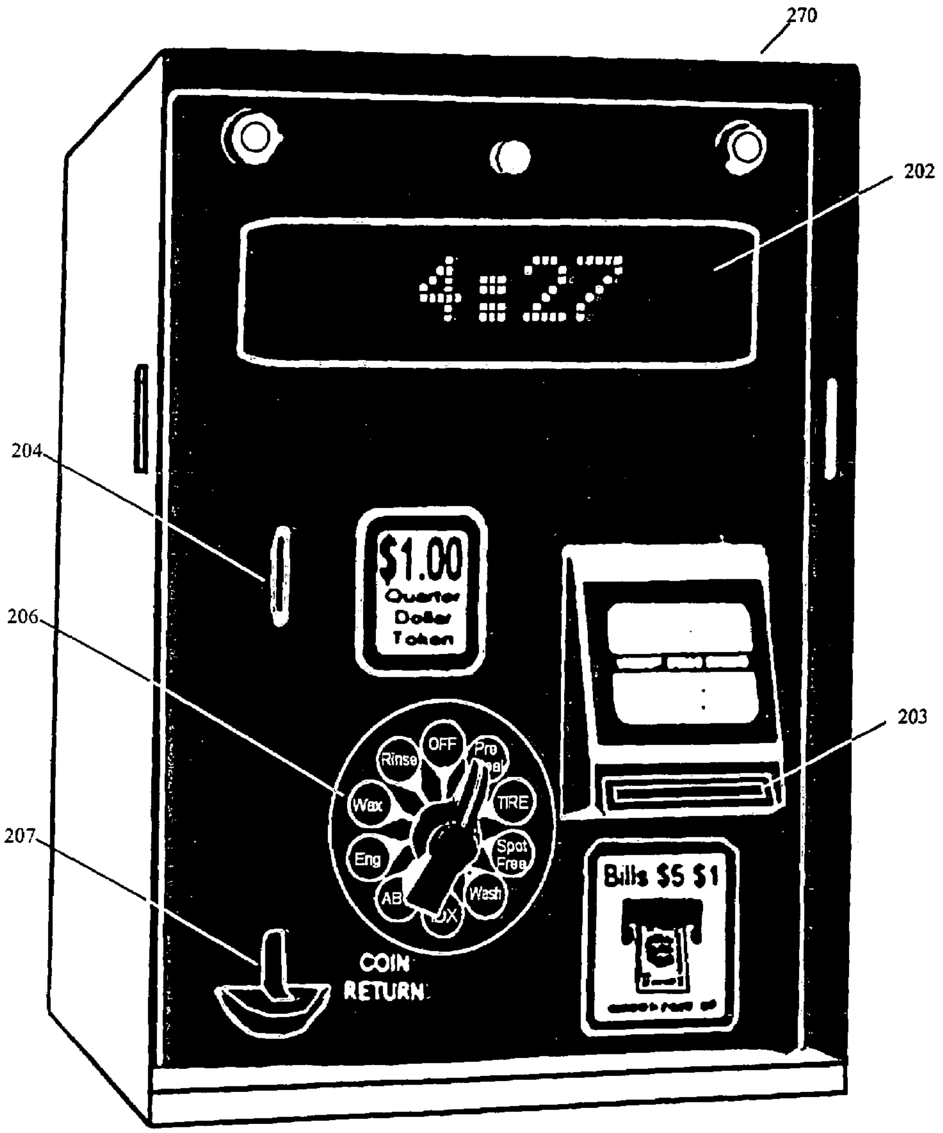
FIG. 4 is a front perspective view, and illustrates a time-metered service vending machine.
Figure 9:
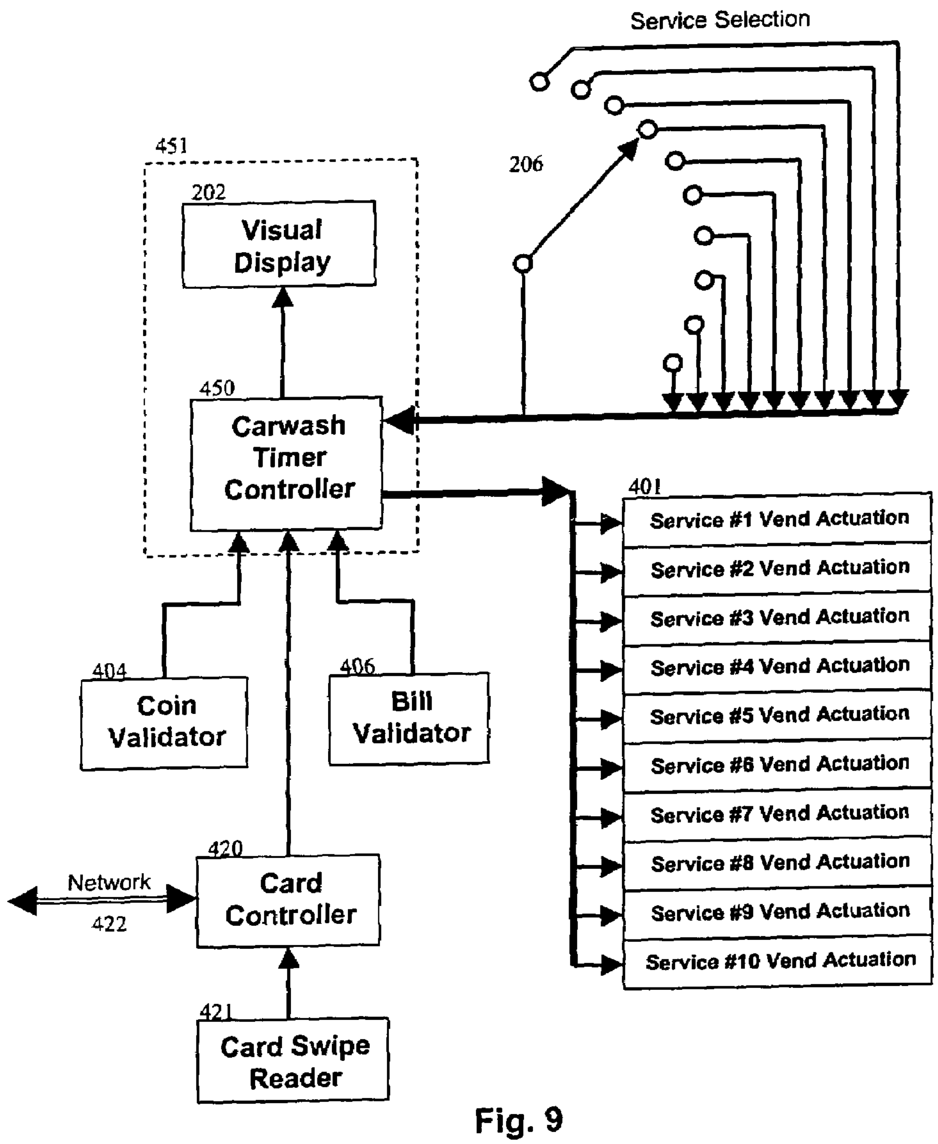
FIG. 9 is a block diagram of a time-metered service vending machine having promotional features, and illustrates components thereof and cooperative interaction therebetween.

A time-metered service vending machine 270 of FIG. 4 is typical of so-called meter boxes found in self service carwashes. In normal operation, a patron inserts the requisite number of coins or tokens into coin slot 204 for validation by coin validator 404 of FIG. 9, or inserts the requisite number of bills or token notes into slot 203 for validation by bill validator 406. The validator typically sends a series of logic pulses to the carwash timer control 450 to represent the value received. The value received, or time in proportion to the value received is displayed on visual display 202. When the carwash timer control 450 has received sufficient credit value, its control output is turned on and power is routed to the appropriate solenoid 401, or other appropriate electromechanical actuator device, to enable delivery of the service determined by a patron's service selection with rotary switch 206. Cleaning solutions such as rinse water, soap water, engine cleaner, and wax sealer are then delivered to the patron through one or more hoses. Today, the timer controller 450 and display 202 are typically combined into as single display-timer device 451. Usage of the two terms herein will be consistent in this manner.

As previously discussed, most all coin validators 404 and bill validators 406 are additionally capable of validating a token or token note. It is also becoming more common for a self service carwash system to have a card swipe reader 421 (FIG. 9) so that a patron my use a credit card or debit card to pay for rendered carwash services. Companies such as WashCard additionally provide backroom account management systems for these cards, and for private cards suitable for fleets or other frequent vehicle washing customers. Such cards are also useful as a promotional token wherein a customer ID is read by card swipe reader 421 and checked by card controller 420 against its own local database or a database accessible over network 422 having customer ID numbers to determine if the promotion is valid for this customer. Some cards may be gift cards good for a single wash, while others may be the card of an account holder who is entitled to a free carwash on his birthday each year.

Time-metered carwash services don't particularly address the concept of "brand" or "manufacturer" by which one might differentiate a proper subset of available services. Furthermore, vending a single one of the services during a promotion doesn't make sense either as a carwash involves using a plurality of the available services for each washed car. However, a free promotional token that provides a predetermined amount of time limited to vending all but the most expensive of services does have value. Operators want to attract new customers, but their cost for vending engine cleaning solution is significantly higher than the cost for vending rinse water, or even soap water. Providing a means by which only a proper subset of the most economical services can be vended thus has value to operators wanting to promote their services. In the later context, a low price basic set of services can be considered a "brand" that is different from a set of services including some having premium performance for a premium price.

A first preferable means for the carwash timer controller 450 to associate a proper subset of services with a promotional token is by incorporating the switches 301 and 302 of FIG. 8*a*. Although carwash coin and bill validators do not use the previously described MDB interface which provides the identity of a validated token, the identity is indirectly provided through the number of pulses transmitted to convey the value received. In these validators the number of pulses produced for a given token is programmable. A pulse is typically denominated to mean 25¢ or $1.00 for example. Thus, a promotional token could be programmed to produce a series of 11 (hexadecimal B) pulses and be recognized as a promotional token because no other coin denomination or bill denomination has a value equal to an 11 times multiple a single pulse denomination. In this example, the rotary switch 301 would be set to position B so that a series of 11 pulses causes the token to be separately recognized as a promotional token. The individual switches of DIP switch 302 are set if a particular service is to be associated with the promotional token. Thereby, services that are expensive to vend can be disabled. The value assigned to the promotional token would not then be 11 pulses worth of credit, but rather would be assigned the value of one standard vend. For such time-metered service vending machines it is typical to require some fixed minimum amount of credit value prior to commencing delivery of any of the services. For example, the timer controller may be configured to require insertion of at $1.00 of value for four minutes of service at a minimum. Thus, the promotional token would provide four minutes of service, limited to those services that are a member of the proper subset of all services available for vending.

A second preferable means for the carwash timer controller 450 to associate a proper subset of services with a promotional token is to do so automatically utilizing an algorithm. In some time-metered service vending machines, each of the services may have a different time/value ratio assigned to them as is disclosed in U.S. Pat. No. 5,371,681 granted Dec. 6, 1994 to Juds et al. and incorporated herein by reference. In such systems, rinse water will likely be given more time per dollar than engine cleaner simply based on the expense of vending one material versus the other. Many self service carwash vending machines offer as many as a dozen different services today. Adding another layer to the already burdensome setup menu system to configure associated time/value parameters and associated display messages for each service it not an attractive thought, although it is a viable method. Furthermore, having some items configured by menu and some by switches found inside the enclosure is also not an attractive thought. However, for applications like the self service carwash it is understood that a promotional token is not for promoting an individual service, but for giving someone the opportunity to try the experience of using the carwash services in general, but not necessarily the services that are most expensive to vend. Thus, when each of the services has its own time/value setting, the timer controller can eliminate the need for configuration switches or more configuration menu layers by automatically determining which services will be made available when a patron inserts a promotional token. The algorithm may be as simple as computing an average of the time/value ratios for all of the services and then making each service having a time/value ratio greater than average a member of the proper subset to be associated with the promotional token. Low expense services, such as vending rinse water, will have a comparatively high time/value ratio because, for a given amount of credit value, it will be allocated a relatively larger amount of vending time. Obviously, one could alternatively make the cut at a place other than the average value, such as ⅔ the average value or 40% of the average value and stay within the spirit, scope, and meaning of having an automatic and simple algorithm.

A third preferable means for the carwash timer controller 450 to associate a proper subset of services with a promotional token is to do so with a sort of hybrid of the aforementioned first and second preferable methods wherein the timer controller 450 automatically assignees only a certain portion of its control outputs as members of the proper subset of services. Those which are to be made available for a promotional token are simply connected to that certain portion of control outputs from the timer controller 450. For example, service vend actuators 401 of FIG. 9 includes vend actuators #1, 3, 5, 7, and 9 that can be designated to vend the lowest cost services, whereas vend actuators #2, 4, 6, 8, and 10 can be designated to vend the highest cost services. In this manner, associating a proper subset of services with a promotional token becomes only a matter of the order in which the equipment installer connects the control outputs from the timer controller 450 to each of the various vend actuators 401.

A patron using a promotional token at a time-metered service vending machine and receiving only the limited proper subset of services may desire to have more time than originally provided by the promotional token and thus may add additional credit value by inserting currency or using a credit or a debit card. Accordingly, when the additional credit value is received, the limitation to only the proper subset of items may optionally be removed so that the patron may vend even the premium value services.

Figure 5:
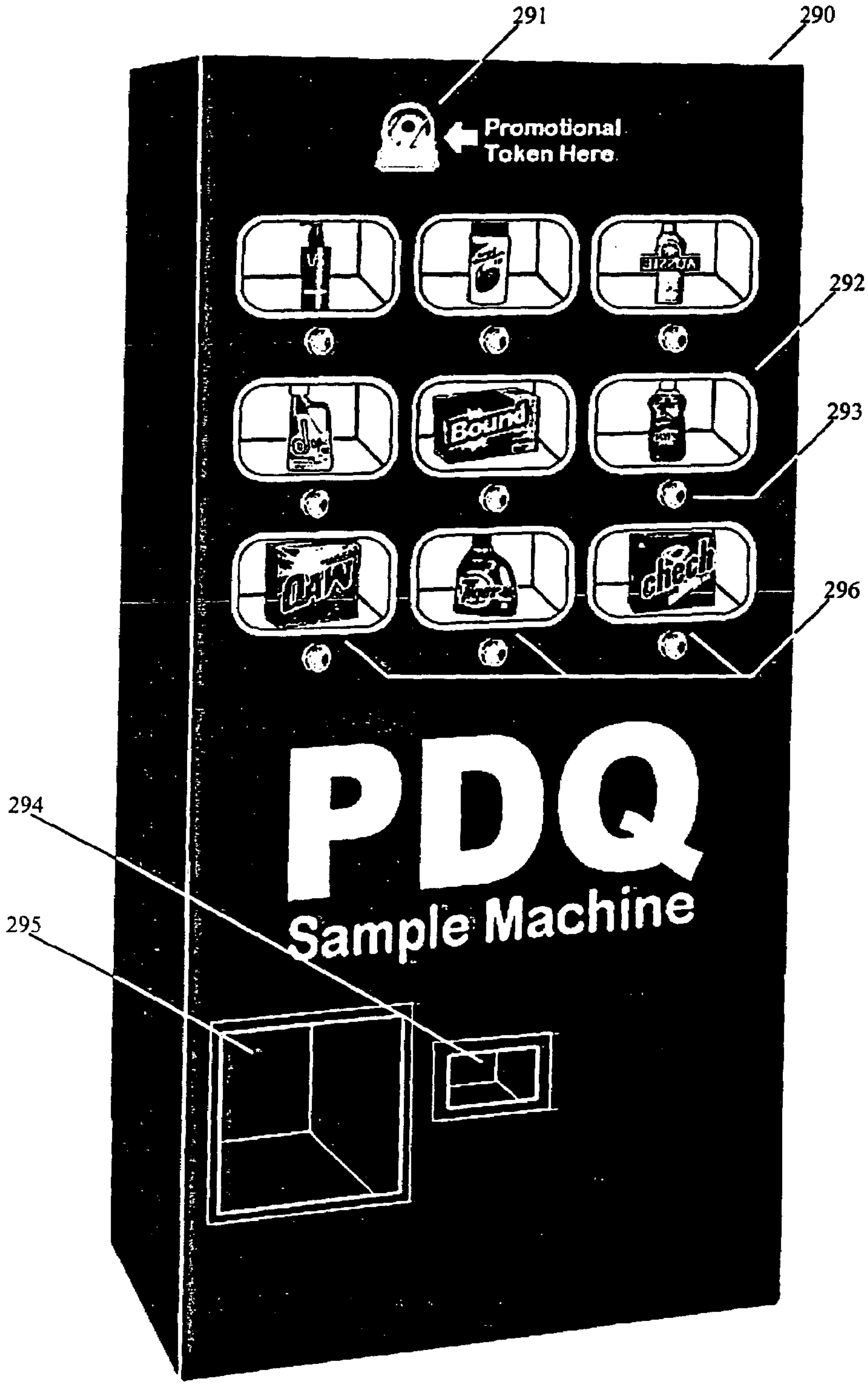
FIG. 5 is a front perspective view, and illustrates a product sample vending machine.
Figure 10:
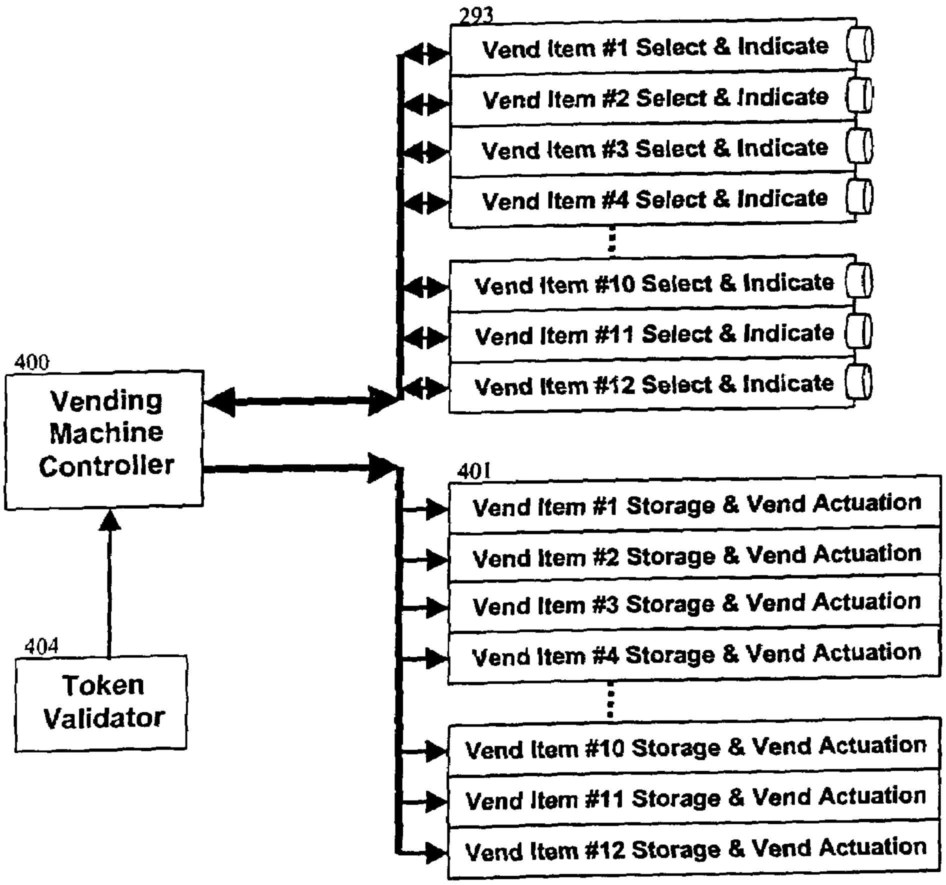
FIG. 10 is a block diagram of a product sample vending machine having promotional features, and illustrates components thereof and cooperative interaction therebetween.

A product sample promotional token is required to operate sample vending machine 290 of FIG. 5. The product sample promotional token is made available within, as part of, or attached to the packaging of a product a patron has previously purchased. A product sample token may be of the type previously discussed wherein it is metallic or plastic, of disk shape, has at least one distinguishable security feature to associate it with a sponsor, and which can be validated by a suitable token validator 404 of FIG. 10. The IDX Model X-10 coin validator, for example, validates a token based on its alloy, diameter, and an optical code minted in the token's surface referred to as X-Mark. It is important to be able to associate a specific token with a specific manufacturer so that the sample vending machine is only enabled by tokens provided by the manufacturer of product samples within the vending machine. The IDX X-Mark system allows for many distinct tokens to enable association of a specific token with a specific manufacturer so that well known cross-play security problems with simple tokens can be avoided. Furthermore, in accordance with the present invention, the manufacturer may require multiple distinct secured tokens for different products or product groups. Such a token may, for example, be dropped into a box of laundry detergent during the box filling operation at the factory. Eventually the patron finds the token and brings it to the store having a sample vending machine 290.

The sample vending machine 290 of FIG. 5 has a coin slot 291 for accepting a promotional token. Displayed sample items, such as product sample 292, each have a corresponding selection button 293. A rejected token return 294, and a chute 295 for picking up dispensed product samples are provided. The block diagram of FIG. 10 for a product sample vending machine is fairly simple. While the promotional token of other applications previously described is a positive relationship wherein the token relates to a specific item or group of items to vends, in this application the relationship is the opposite. For example displayed sample items 296 are all different brands of laundry detergent. A patron finding a promotional token within a package of one of these laundry detergent products is already buying a laundry detergent product from the manufacturer, so there is no marketing purpose in providing the patron with a product sample of more laundry detergent, but there is a marketing purpose to providing the patron with a product sample of anything but laundry detergent to hopefully induce the patron to try some other product of the manufacturer. It could be dish detergent, deodorant, toothpaste, or any other number of product categories, just not laundry detergent. Thus, the objective here is to have multiple promotional tokens, each associated with the purchase of a specific product brand or category, and each enabling a proper subset of the product samples to be made available to the patron that does not include the specific product brand of the prior purchase by which the promotional token was acquired. Means for configuring the sample vending machine controller to vend according to these associations between promotional tokens and product samples can be by either of the means previously described in FIG. 8*a* or FIG. 8*b*.

When providing a system that limits the patron's available selection to only a proper subset of the vending machine's products or services when a patron uses a promotional token, a token management problem arises when the patron attempts to use a subsequent promotional token before the machine has completed the current vending cycle involving the first promotional token. For example, if the token has attributed to it a value of $1.00 for an item that is priced at $2.00, it would likely not be the marketing promotion intent to allow the patron to use a second identical token to get the item for free. Furthermore, if the subsequent promotional token was different from the first promotional token, it may be unclear what subset of items are to be made available. The NRI G-46 (a combination coin validator 404, coin changer 405, and machine controller 400), addresses the first portion of this problem by limiting acceptance of tokens to one per vend. However, there at least two promotional strategies where one would actually want to accept more than one token per vend.

In a first promotional strategy for multiple token acceptance, a first promotional token is provided to a patron within or attached to a purchase of a first product, and a second different and distinguishable promotional token is provided to a patron within or attached to a purchase of a second product. For example, The Cherry-Berry item of FIG. 8*b* is associated with two tokens separately identified as #14 and #15. The MDB coin validator 404 could be programmed to give a value of 75¢ for each of these tokens. In this strategy more than one token may be accepted per vend provided that the following conditions are met: a) each distinct token type may be accepted a maximum of once per vend, b) a subsequent token may be accepted only if the intersection of the proper subset of items for the subsequent token and each previously accepted token contains at least one item, c) a subsequent token may not be accepted if it or a previously accepted token has a value defined as one full vend. In the example of FIG. 8*b*, if token #13 was the first to be accepted, then no other tokens could be accepted until an item was vended. If token #14 was the first to be accepted, then only token #15 is a candidate for subsequent acceptance provided that neither token #14 nor token #15 is a full vend token. According to this example of this feature of the present invention, a patron could pay $1.50 to vend the Cheery-Berry drink, use just one of the tokens and pay an additional 75¢ to vend the Cherry-Berry drink, or acquire and use both token types to vend the Cherry-Berry drink without further cost.

In a second promotional strategy for multiple token acceptance, a first promotional token is provided to a patron within or attached to a purchase of a first product, and a second promotional token is provided to the patron as change from a vending machine. A route operator may wish to provide an incentive to his regular customers to make future purchases by providing some portion of the change, or possibly excess change, in the form of a token having some nominal value in the machines owned by the route operator. A first example algorithm is to provide excess token change in the amount of, for example, 10% of the non-token credit value purchased by the patron. A second example algorithm is to provide excess token change in the amount of, for example, 10% of the credit value returned to the patron after a vend. A third example algorithm is to provide excess token change in the amount of, for example, 10% of the total non-token credit value put into the machine by the patron. A route operator's token of this kind has general value in promotion of the machine and directly represents an identifiable credit value in the same manner that a currency coin represents identifiable credit value. As such, one or more route operator tokens, each representing a predetermined fixed value, should be acceptable as additional payment following the acceptance of a promotional token for vending one item of a proper subset of the machine's items.

Another token management problem arises for a system that limits the patron's available selection to only a proper subset of the vending machine's products or services when a patron uses a promotional token and then walks away from the machine without having completed the vending cycle. A second patron may likely later wish to use the vending machine to vend an item that is not a member of the proper subset of items associated with the prior patron's validated promotional token. In this instance the second patron would be unable to use the machine and may retain residual distrust of the machine in the future. In order to resolve this problem, the machine controller 400 must eventually recognize that an excessive period of time has elapsed without completion of a vend cycle involving the promotional token. Thus, after a predetermined promotional token cancellation timeout period has elapsed, perhaps about one to five minutes, the machine controller then either returns the token to the patron, or if that is not possible, clears all remaining credit attributed to a validated promotional token and clears any associated limitations for item selection in order that subsequent patrons will be provided a clean vending experience.

Still another token management problem arises for a system that limits the patron's available selection to only a proper subset of the vending machine's products or services when a patron uses a promotional token and then walks away from the machine without having completed the vending cycle. A second patron may immediately wish to use the vending machine to vend an item that is not a member of the proper subset of items associated with the prior patron's validated promotional token. In this instance the second patron would be unable to use the machine even if the previously described timeout feature had been implemented, because the timeout period had not yet elapsed. In order to resolve this problem, the vending machine must continue to accept currency, credit cards, debit cards, or other means of providing credit value whereby the patron can still fully pay for and vend the item desired. Thus, as a patron provides sufficient additional credit value to the machine to meet or exceed the price for vending other items for which the credit value of the validated promotional token does not apply, then those items additionally become available to the patron for vending. Furthermore, if a patron chooses to then vend an item other than the item for which the promotional token was intended, the machine controller then clears all remaining credit attributed to a validated promotional token and clears any other associated limitations for item selection in order that subsequent patrons will be provided a clean vending experience. In other words, the current patron has demonstrated that there is no further interest in the promotional token, so the machine eats the promotional token.

Yet another token management problem arises for a system utilizing a promotional token having a fractional vend value that requires the patron to add further credit value with currency, a credit card or a debit card to complete the vend transaction. Certainly one of the marketing objectives of a promotional token's sponsor does not include simply allowing a patron to change a promotional token into cash without trying the promoted product or service. In order to resolve this problem the vending machine controller separately tracks the credit value provided by the promotional token from other currency, credit and debit sources. However, not all sources of credit value are reversible in a vending machine. For example, most bill validators 406 are not so-called recycling bill validators capable of returning bills to the patron. So, once a bill or token note is accepted, it is there to stay. Likewise, a promotional token may not have a coin changer tube dedicated to it, thus requiring an accepted promotional token to pass through to the drop vault. However, small currency coins are filled into, and discharged from coin tubes in the coin changer 405 and may be returned to the patron as necessary. In order to prevent a vending machine from being used as a change making machine, many vending machine controllers 400 provide the option to commit the credit value on a machine to completing a vend before making change if some or all of the credit value was provided via the bill validator 406. Other machines having credit or debit card readers hold all transactions for later economical bulk processing and thus are able to easily reverse a charge not yet fully processed should the patron wish to cancel the transaction before vending an item. However, requesting change via the coin return lever 201 of FIG. 2 or FIG. 3 after having inserted a promotional token will be problematic if the token is non-returnable. The specific request for change or to cancel the transaction via the coin return lever 201 provides additional information to the machine useful in managing this problem.

On way of dealing with the aforementioned problem is to implement a procedure in the vending machine controller 400 for hastening clearing of the promotional token from the vending machine when the coin return lever 201 is activated. One such algorithm is as follows: (1) return any uncommitted currency-based credit remaining on the machine via dispensing coins from the coin changer, (2) cut the predetermined token cancellation timeout period in half, and (3) when the token cancellation timeout period elapses, clear all remaining credit and offering limits attributed to the validated promotional token. Making a reduction in the timeout period when the coin return button 201 is pushed hastens the return of the machine to its cleared state, while still leaving the patron with some time to re-try vending an item associated with the token before the token is eaten by the machine. It should be understood that whether the reduction is 50%, 1%, or 99%, it is still within the spirit of taking action to reduce the remaining timeout period as a response to the patron's action to press the coin return lever 201.

Finally, one last token management problem arises for a system that limits the patron's available selection to only a proper subset of the vending machine's items when a patron uses a promotional token. If there is no indication of which subset of items is available with the promotional token, the patron may become confused and frustrated with the machine. A first solution is to illuminate the selection buttons according to the availability of the item. For example, in vending machine 200 of FIG. 2, buttons 205 corresponding to a promotional token are exclusively illuminated after validation of a promotional token, and all buttons 205 and 206 (see also FIG. 6) are illuminated upon validation of sufficient credit value of any kind to vend any one of the items. However, in vending machine 240 of FIG. 3, there is not a one-to-one correspondence between an item and a selection button. In this instance the item tag 246 beneath each of the items in the display window carries information about the vend code and the price, and can also display an icon indicating that the item is associated with a particular promotional token. Alternatively, one might be a bit fancier and arrange to back-illuminate the tag or spotlight the item to indicate its availability for selection.

Figure 11:
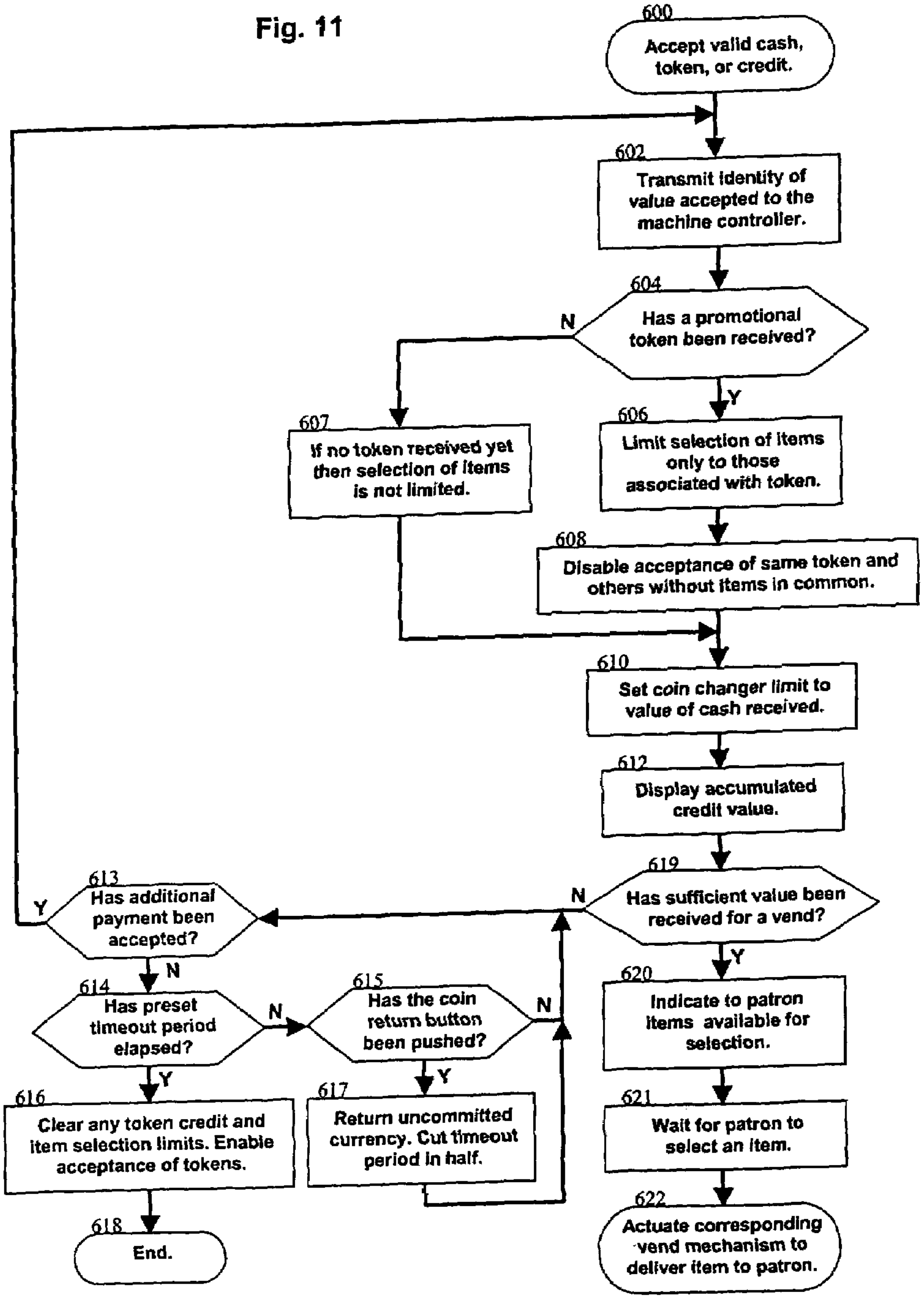
FIG. 11 is a flow chart, and illustrates the performance steps for one embodiment of a vending machine having promotional features.

The flow chart of FIG. 11 summarizes the basic operation of a beverage or snack vending machine 200 or 240. When value is received at step 600, the nature or identity of the value received is transmitted to the vending machine controller at step 602. Steps 604 through 608 limit selection availability to the proper subset of items associated with a promotional token if one has been received, and disables further acceptance of the same token or other tokens not having items in common with the current subset of available items. Steps 613 through 619 ensure that sufficient credit value has been accumulated for a vend and provides a timeout for the promotional token validation to ensure that one patron does not permanently leave the vending machine incapable to deliver an item from the machine that is not a member of the proper subset of items associated with the promotional token. Steps 620 through 622 complete the vend process with the selection of one of the available items and the resultant vend of that item.

Figure 12:
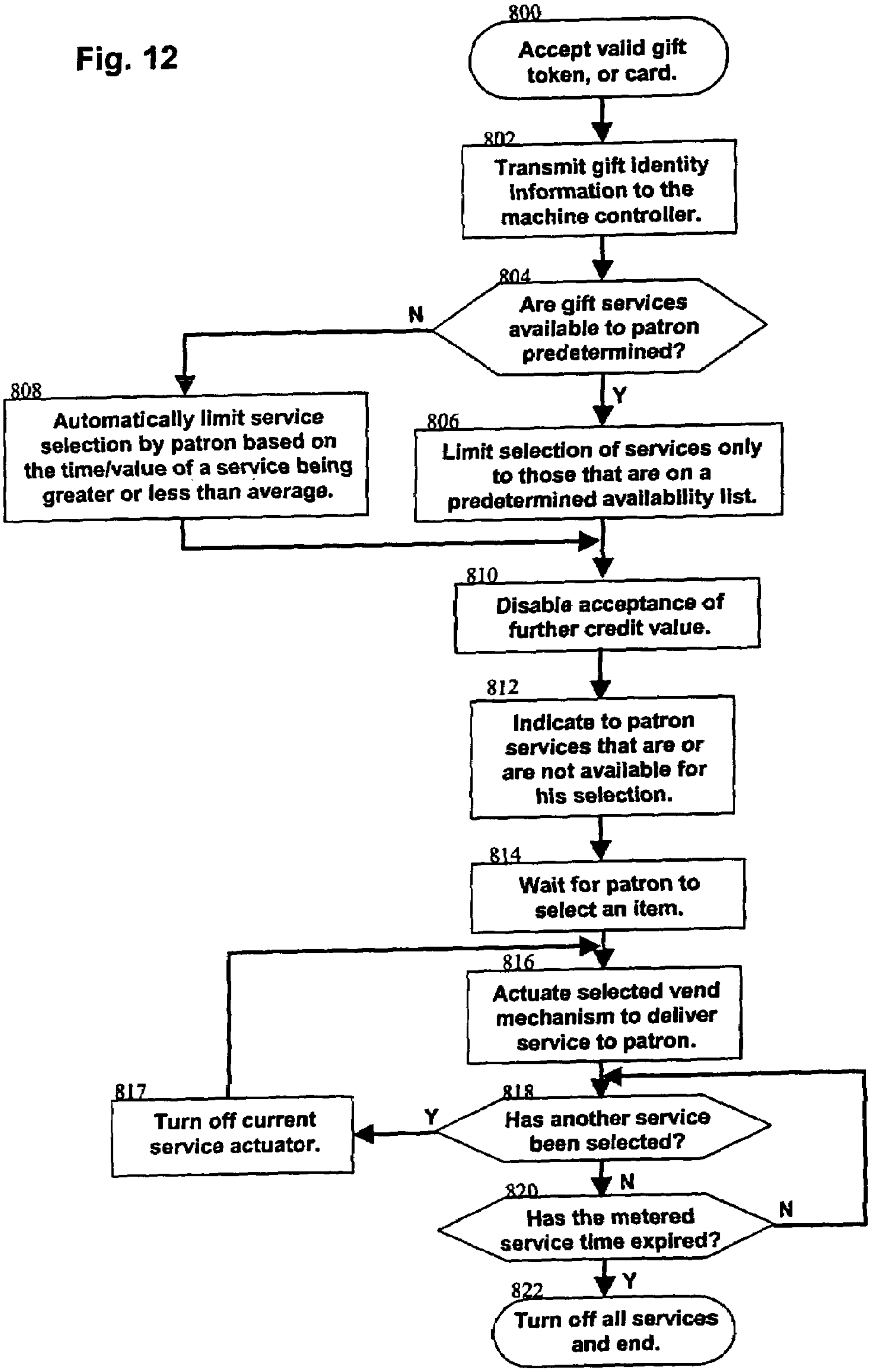
FIG. 12 is a flow chart, and illustrates the performance steps for one embodiment of a vending machine having promotional features.

The flow chart of FIG. 12 summarizes the basic operation of a time-metered service vending machine 270. When value is received at step 800, the nature or identity of the value received is transmitted to the timer controller at step 802. Steps 804 through 810 limit selection availability to the proper subset of services associated with a promotional gift token if one has been received, and disables further acceptance of the same token or other tokens. Steps 812 through 822 complete the vend process with the selection of one of the available services, the resultant vend of that item, and the ability to change to vending of other services so long as the metered service time has not expired.

Figure 13:
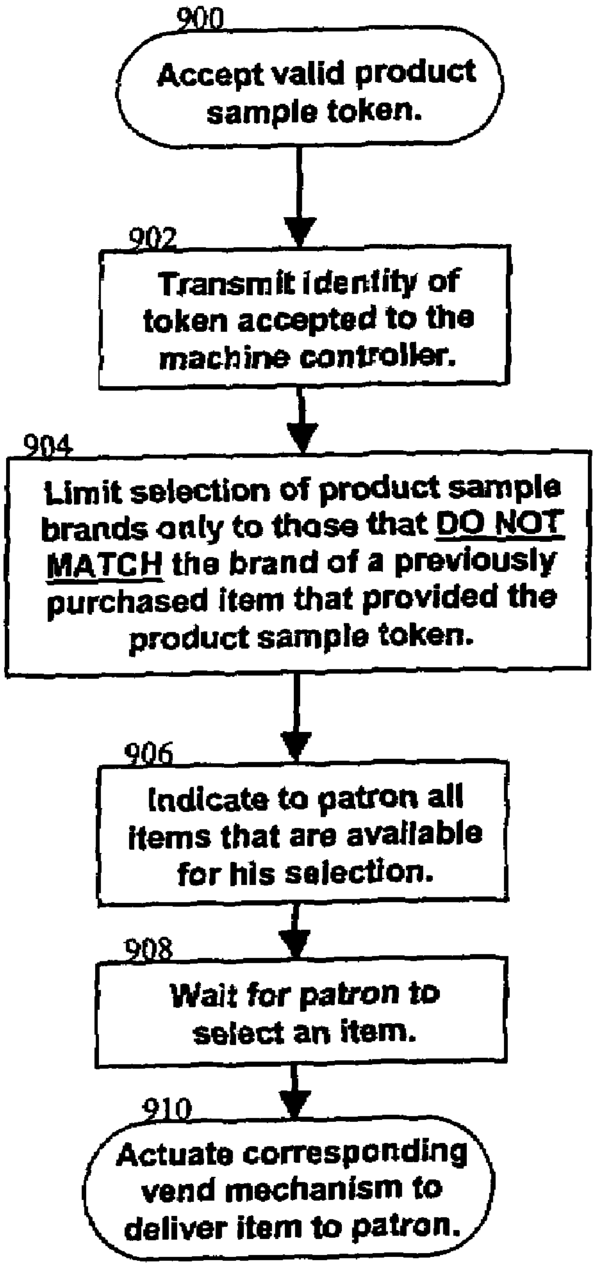
FIG. 13 is a flow chart, and illustrates the performance steps for one embodiment of a vending machine having promotional features.

The flow chart of FIG. 13 summarizes the basic operation of a product sample vending machine 290. When a promotional token is validated at step 900, its identity is transmitted in step 902 to the vending machine controller. In step 904 the vending machine controller limits selection of the product sample brands to only those brands that are not the same as the brand of a previously purchased product through which the product sample token was provided.

It is to be understood that the above described embodiments of the present invention are illustrative only, and many variations and modifications will become apparent to one skilled in the art without departing from the spirit and scope of the present invention.

What is claimed is:

1. A vending machine for dispensing food or beverage items comprising storage and vend actuation means for a plurality of food or beverage items, currency validation means for authenticating a patron's payment to provide credit toward the purchase of a food or beverage item, token validation means for authenticating a promotional token associated with a proper subset of the plurality of food or beverage items, wherein the promotional token has at least one security feature distinguishable by the token validation means for identifying it as an authentic promotional token, promotional logic means for limiting the offering of available food or beverage items to the union of the proper subset of items associated with the validated promotional token and the subset of all items for which the item's price has been met or exceeded by applicable accumulated credit, token management means for clearing all accumulated credit and item selection limits attributed to the validated promotional token if a patron selects and the machine vends an offered item which is not a member of the proper subset of items associated with the promotional token, item selection means for a patron to select from among the offered food or beverage items, and vending machine control means for receiving currency and token validation information, for performing promotional logic and token management procedures, for receiving item selection information, and for producing a vend control signal for the corresponding vend actuation means for delivering to the patron his selection.

2. The vending machine according to claim 1 wherein the token management means additionally disables validation of a subsequent promotional token if either the first promotional token or the subsequent promotional token have a value of one vend, or if the first and subsequent promotional tokens are the same.

3. The vending machine according to claim 1 wherein the token management means additionally clears all accumulated credit and item selection limits attributed to the validated promotional token after a predetermined period of time has elapsed without completing a vend, or since the most recent activity in the vending cycle.

4. Then vending machine according to claim 3 wherein a patron's activation of the coin return button causes the token management means to reduce the predetermined period of time by a predetermined amount or percentage.

5. A vending machine for dispensing food or beverage items comprising storage and vend actuation means for a plurality of food or beverage items, currency validation means for authenticating a patron's payment to provide credit toward the purchase of a food or beverage item, token validation means for authenticating a promotional token associated with a proper subset of the plurality of food or beverage items, wherein the promotional token has at least one security feature distinguishable by the token validation means for identifying it as an authentic promotional token, promotional logic means for limiting the offering of available food or beverage items to that of the proper subset of items associated with the validated promotional token, token management means for disabling validation of a subsequent promotional token if the proper subset of food or beverage items associated with the subsequent promotional token contains no items that are a member of the current subset of food or beverage items offered for selection, item selection means for a patron to select from among the offered food or beverage items, and a vending machine control means for receiving currency and token validation information, for performing promotional logic and token management procedures, for receiving item selection information, and for producing a vend control signal for the corresponding vend actuation means for delivering to the patron his selection.

6. The vending machine according to claim 5 wherein the token management means additionally disables validation of a subsequent promotional token if either the first promotional token or the subsequent promotional token have a value of one vend, or if the first and subsequent promotional tokens are the same.

7. The vending machine according to claim 5 wherein the token management means additionally clears all accumulated credit and item selection limits attributed to the validated promotional token after a predetermined period of time has elapsed without completing a vend, or since the most recent activity in the vending cycle.

8. The vending machine according to claim 7 wherein a patron's activation of the coin return button causes the token management means to reduce the predetermined period of time by a predetermined amount or percentage.

9. A vending machine for dispensing food or beverage items comprising a storage and vend actuation means for a plurality of food or beverage items, a currency validation means for authenticating a patron's payment to provide credit toward the purchase of a food or beverage item, a token validation means for authenticating at least two different promotional tokens, each associated with vending a different proper subset of the plurality of food or beverage items, wherein each different promotional token has at least one different security feature distinguishable by the token validation means for identifying it as a distinct authentic promotional token, a promotional logic means for limiting the offering of available food or beverage items to that of the proper subset of items associated with the validated promotional token, a token management for disabling validation of a subsequent promotional token if the proper subset of food or beverage items associated with the subsequent promotional token contains no items that are a member of the current subset of food or beverage items to be offered for selection, an item selection means for a patron to select from among the offered food or beverage items, and a vending machine control means for receiving currency and token validation information, for performing promotional logic and token management procedures, for receiving item selection information, and for producing a vend control signal for the corresponding vend actuation means for delivering to the patron his selection.

10. The vending machine according to claim 9 wherein the token management means additionally clears all accumulated credit and item selection limits attributed to the validated promotional token after a predetermined period of time has elapsed without completing a vend, or since the most recent activity in the vending cycle.

11. The vending machine according to claim 10 wherein a patron's activation of the coin return button causes the token management means to reduce the predetermined period of time by a predetermined amount or percentage.

12. A method of vending food or beverage items comprising the steps of providing a vending machine with a storage and vend actuation means for a plurality of food or beverage items, providing a patron with a promotional token having at least one machine readable security feature to identify it as an authentic promotional token, associating the promotional token with a proper subset of the plurality of food or beverage items, machine-validating a patron's promotional token, machine-validating a patron's currency if additional credit value toward the purchase of a food or beverage item is required, limiting the offering of available food or beverage items to the union of the proper subset of items associated with the validated promotional token and the subset of all items for which the item's price has been met or exceeded by applicable accumulated credit, selecting an item from among the offered food or beverage items, producing a vend control signal for the corresponding vend actuation means for delivering to the patron his selection if sufficient credit value has been accumulated to enable vending the selected item, and clearing all accumulated credit and item selection limits attributed to the validated promotional token if a patron selects and the machine vends an offered item which is not a member of the proper subset of items associated with the promotional token.

13. The method of vending food or beverage items according to claim 12 including the further step of indicating to the patron which subset of the displayed items are available for selection with the promotional token.

14. The method of vending food or beverage items according to claim 12 including the further step of disabling validation of a subsequent promotional token if either the first promotional token or the subsequent promotional token have a value of one vend.

15. The method of vending food or beverage items according to claim 12 including the further steps of determining that a predetermined period of time has elapsed without completing a vend, or since the most recent activity in the vending cycle, and clearing all accumulated credit and item selection limits attributed to the validated promotional token.

16. The method of vending food or beverage items according to claim 15 including the further steps of activating the coin return button, and reducing the predetermined period of time by a predetermined amount or percentage.

17. A method of vending food or beverage items comprising the steps of providing a vending machine with a storage and vend actuation means for a plurality of food or beverage items, providing a patron with a promotional token having at least one machine readable security feature to identify it as an authentic promotional token, associating the promotional token with a proper subset of the plurality of food or beverage items, machine-validating a patron's promotional token, machine-validating a patron's currency if additional credit value toward the purchase of a food or beverage item is required, limiting the offering of available food or beverage items to that of the proper subset of items associated with the validated promotional token, disabling validation of a subsequent promotional token if the proper subset of food or beverage items associated with the subsequent promotional token contains no items that are a member of the current subset of food or beverage items to be offered for selection, selecting an item from among the offered food or beverage items, and producing a vend control signal for the corresponding vend actuation means for delivering to the patron his selection if sufficient credit value has been accumulated to enable vending the selected item.

18. The method of vending food or beverage items according to claim 17 including the further step of indicating to the patron which subset of the displayed items are available for selection with the promotional token.

19. The method of vending food or beverage items according to claim 17 including the further step of disabling validation of a subsequent promotional token if either the first promotional token or the subsequent promotional token have a value of one vend.

20. The method of vending food or beverage items according to claim 17 including the further steps of determining that a predetermined period of time has elapsed without completing a vend, or since the most recent activity in the vending cycle, and clearing all accumulated credit and item selection limits attributed to the validated promotional token.

21. The method of vending food or beverage items according to claim 20 including the further steps of activating the coin return button, and reducing the predetermined period of time by a predetermined amount or percentage.

22. A method of vending food or beverage items comprising the steps of providing a vending machine with a storage and vend actuation means for a plurality of food or beverage items, providing a patron with, a first promotional token having at least one machine readable security feature to identify it as an authentic first promotional token, providing a patron with, a second promotional token having at least one machine readable security feature distinguishable from the first promotional token's security feature to identify it as an authentic second promotional token, associating the first promotional token with a first proper subset of the plurality of food or beverage items, associating the second promotional token with a second different proper subset of the plurality of food or beverage items, machine-validating a first promotional token, limiting the offering of available food or beverage items to that of the proper subset of items associated with the first promotional token, disabling subsequent validation of a second promotional token if the proper subset of food or beverage items associated with the second promotional token contains no items that are a member of the proper subset of items associated with the first promotional token, machine-validating a patron's currency if additional credit value toward the purchase of a food or beverage item is required, selecting an item from among the offered food or beverage items, and producing a vend control signal for the corresponding vend actuation means for delivering to the patron his selection if sufficient credit value has been accumulated to enable vending the selected item.

23. The method of vending food or beverage items according to claim 22 including the further step of indicating to the patron which subset of the displayed items are available for selection with at least one of the first and second promotional tokens.

24. The method of vending food or beverage items according to claim 22 including the further steps of determining that a predetermined period of time has elapsed without completing a vend, or since the most recent activity in the vending cycle, and clearing all accumulated credit and item selection limits attributed to the validated promotional token.

25. A vending machine for providing time-metered services to a patron comprising display-timer means for providing a time-metered output signal to enable one of a plurality of services, currency validation means for providing credit value towards vending a service, token validation means for authenticating a promotional token associated with a proper subset of the plurality of services, wherein the promotional token has at least one security feature distinguishable by the token validation means for identifying it as an authentic promotional token, promotional logic means included within the display-timer means for limiting the offering of available services to that of the proper subset of services, wherein membership of a service in the proper subset of services is automatically determined at least in part by its time/value ratio, or is a predetermined proper subset of the plurality of services, service selection means for a patron to select from among the offered services, and electromechanical means responsive to the selection means and to the time-metered output signal for delivering the selected service to the patron.

26. The vending machine according to claim 25 wherein the promotional logic means further removes all limits on the offering of available services if further credit value is provided by the currency validation means.

27. The vending machine according to claim 25 further including means for disabling validation of a second promotional token for a time interval during which a vended service is being provided.

28. A method of vending time-metered services to a patron comprising the steps of providing a patron with a promotional token having at least one machine readable security feature to identify it as an authentic promotional token, providing a display-timer having a time-metered output signal to enable one of a plurality services, associating the promotional token with a proper subset of the services wherein membership of a service in the proper subset of services is automatically determined at least in part by its time/value ratio, or is a predetermined proper subset of the plurality of services, machine-validating a patron's promotional token, limiting the offering of available services to that of the proper subset of services associated with the promotional token, indicating to the patron which subset of services are available for selection with the promotional token, selecting a service from among the offered services, and producing a time-metered output signal to enable an electromechanical means for delivering the selected service to the patron.

29. The method of vending time-metered services to a patron according to claim 28 including the further steps of machine-validating a patron's currency, credit card, or debit card to add additional credit value, and removing any limits on the offering of available services.

30. The method of vending time-metered services according to claim 28 including the further step of disabling validation of a second promotional token for a time interval during which a vended services is being provided.

31. A vending machine for dispensing product samples to a patron comprising a storage and vend actuation means for product samples having a plurality of brands, a token validation means for authenticating at least two different promotional tokens, each associated with vending a different proper subset of the plurality of brands, wherein each different promotional token has at least one different security feature distinguishable by the token validation means for identifying it as a distinct authentic promotional token, and wherein each different promotional token was provided to the patron in conjunction with a prior purchase of a specific product brand, a promotional logic means for limiting the offering of available product sample brands to that of the proper subset of brands associated with a validated promotional token and wherein membership of brands in the proper subset of brands does not include the specific product brand of the prior purchase by which the promotional token was acquired, an item selection means for selecting a product sample from among those offered, and a vending machine control means for receiving token validation information, for performing promotional logic procedures, for receiving item selection information, and for producing a vend control signal for the corresponding vend actuation means for delivering to the patron his selection.

32. A method of vending product samples to a patron comprising the steps of providing a vending machine with a storage and vend actuation means for product samples having a plurality of brands, providing a patron with a first promotional token having at least one machine readable security feature to identify it as an authentic first promotional token, providing a patron with a second promotional token having at least one machine readable security feature distinguishable from the first promotional token's security feature to identify it as an authentic second promotional token, associating the first promotional token with a first proper subset of the plurality of brands wherein the first promotional token was provided to the patron in conjunction with a prior purchase of a first specific product brand, and wherein membership of brands in a first proper subset of brands does not include the first specific product brand of the prior purchase by which the promotional token was acquired, associating the second promotional token with a second proper subset of the plurality of brands wherein the second promotional token was provided to the patron in conjunction with a prior purchase of a second specific product brand, and wherein membership of brands in a second proper subset of brands does not include the second specific product brand of the prior purchase by which the promotional token was acquired, machine-validating one of the first and second promotional tokens, limiting the offering of available product sample brands to that of the proper subset of brands associated with the validated promotional token, selecting a product sample from among those offered, and producing a vend control signal for the corresponding vend actuation means for delivering to the patron his selection.

33. A method of vending food or beverage items comprising the steps of providing a vending machine with a storage and vend actuation means for a plurality of food or beverage items, providing a patron with a promotional token having at least one machine readable security feature to identify it as an authentic promotional token, associating the promotional token with a subset of the plurality of food or beverage items, providing a coin changer having at least one of its coin tubes configured to dispense promotional tokens, machine-validating a patron's currency, credit card, or debit card to provide credit value toward the purchase of a food or beverage item, machine-validating a patron's promotional token to provide credit value toward the purchase of a food or beverage item, limiting the offering of available food or beverage items to the subset of all items for which the item's price has been met or exceeded by applicable accumulated credit, selecting an item from among the offered food or beverage items, producing a vend control signal for the corresponding vend actuation means for delivering to the patron his selection if sufficient credit value has been accumulated to enable vending the selected item, providing change to the patron in the amount of the difference between the accumulated credit value on the machine and the price of the vended item, and providing excess change to the patron, dispensed in promotional tokens, rounded to the denomination of a promotional token, and substantially proportional in value to a percentage of a) the total credit value accumulated and attributed to currency, credit card, or debit card, or b) the total excess credit value accumulated above the price of the vended item and attributed to currency, credit card, or debit card, or c) the price of the vended item.

* * * * *